(12) United States Patent
Chan et al.

(10) Patent No.: US 8,085,494 B2
(45) Date of Patent: Dec. 27, 2011

(54) AIRFLOW DIVERTER IN A HARD DISK DRIVE SYSTEM

(75) Inventors: Andre S. Chan, Milpitas, CA (US); Ryan Thomas Davis, San Jose, CA (US); Antony Nguyen, San Jose, CA (US); Kirk B. Price, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/409,378

(22) Filed: Mar. 23, 2009

(65) Prior Publication Data

US 2011/0043946 A1 Feb. 24, 2011

(51) Int. Cl.
*G11B 33/14* (2006.01)
(52) U.S. Cl. .................. 360/97.02; 360/97.03
(58) Field of Classification Search ............... 360/97.03
See application file for complete search history.

(56) References Cited

U.S. PATENT DOCUMENTS

| | | | |
|---|---|---|---|
| 5,109,310 A | 4/1992 | Ohkjita et al. | |
| 5,404,636 A | 4/1995 | Stefansky et al. | |
| 5,596,461 A | 1/1997 | Stefansky | |
| 6,144,522 A * | 11/2000 | Myokan et al. | 360/97.02 |
| 6,714,379 B1 | 3/2004 | Thompson et al. | |
| 6,771,458 B2 * | 8/2004 | Kim et al. | 360/97.02 |
| 6,922,308 B1 | 7/2005 | Butler | |
| 6,961,219 B2 | 11/2005 | Asano et al. | |
| 7,072,140 B2 | 7/2006 | Asano et al. | |
| 7,355,811 B1 | 4/2008 | Gifford et al. | |
| 7,733,602 B2 * | 6/2010 | Gross et al. | 360/97.03 |
| 7,944,644 B2 * | 5/2011 | Kaneko et al. | 360/97.02 |
| 2005/0141135 A1 | 6/2005 | Soga et al. | |
| 2008/0239574 A1 | 10/2008 | Chan et al. | |

OTHER PUBLICATIONS

Bouchard, et al., "An Experimental Comparison of the Head/Disk Interface Dynamics In 5 ¼- and 8-inch Disk Drives", *IBM J. Res. Develop.* vol. 29, No. 3, (May 1985),316-323.

* cited by examiner

*Primary Examiner* — Tan T. Nguyen

(57) ABSTRACT

An airflow diverter in a hard disk drive system. A top portion configured to couple with a top housing of the disk drive system. A thickness configured to create a top clearance between the diverter and a top actuator arm of the disk drive system wherein the top clearance approximates a bottom clearance between a bottom housing of the disk drive system and a bottom actuator arm of the disk drive system. At least one surface configured to divert the airflow in the disk drive system during the operation of the disk drive system.

20 Claims, 6 Drawing Sheets

400

---

A disk drive system is received, wherein the disk drive system comprises a bottom clearance between a bottom actuator arm of the disk drive system and a bottom housing of the disk drive system.
402

↓

A top clearance is created by coupling an airflow diverter to a top housing of the disk drive, the top clearance housing is between the airflow diverter and a top actuator arm of the disk drive system, wherein creating the top clearance approximates the bottom clearance.
404

↓

A bottom airflow path is detected in the bottom clearance.
406

↓

A top airflow path is created in the top clearance using the airflow diverter, wherein creating the top airflow path approximates the bottom airflow path.
408

FIG. 4

AIRFLOW DIVERTER IN A HARD DISK DRIVE SYSTEM

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

A typical HDD uses an actuator assembly to move magnetic heads so as to write or read data on the desired location in the disk assembly. During this operation, the disk assembly is rotated at predetermined revolutions per minute (RPMs). It is not uncommon for a hard disk drive to operate at speeds of up to 15,000 RPMs at the current state of the art. Airflow inside HDD's generated by the rotational motion of disk assembly results in the vibration in HDD's components. The flow-induced vibration in an HDD system causes what is commonly known as track misregistration (TMR) which is a measurement used to determine the acceptability of errors during data reading and writing process. The severity of flow-induced vibration depends upon geometrical factors used inside an HDD. It is often characterized by the Reynolds number which is proportional to the characteristic speed of the spinning disk (such as the linear speed at the outer diameter of the disk) and the characteristic dimension (such as disk diameter, disk spacing, or any geometrically meaningful length). In order to achieve acceptable level of TMR, it is important to lower the level of excitation during servo pattern writing process. It is a common practice that a somewhat lower rotational speed is used in the servo writing process in order to help lessen the severity of flow-induced vibration. Even as such, the airflow can cause movable components inside the drive to shift relative to each other, including the magnetic disk stack to tilt or the read and write heads to sway relative to each other. This movement leads to improper alignment and produces errors in writing reference servo tracks on the magnetic disks.

BRIEF DESCRIPTION OF THE DRAWINGS

FIG. 4 is a flowchart of a method for diverting air during the operation of a disk drive system in accordance with embodiments of the present invention.

DESCRIPTION OF EMBODIMENTS

Figure 1:
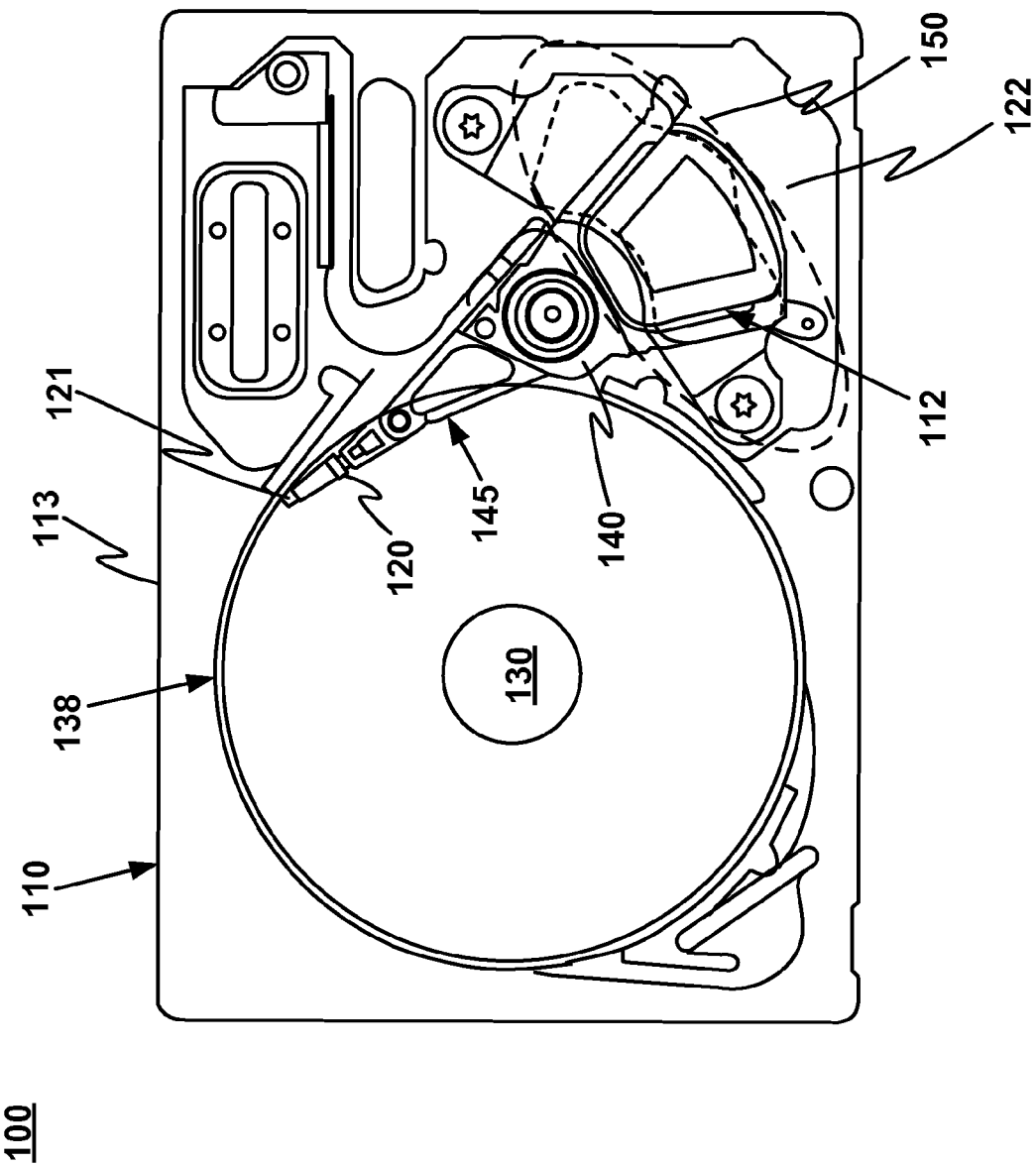
FIG. 1 is a block diagram of an HDD in accordance with embodiments of the present invention.

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Overview of Discussion

The discussion will begin with a brief overview of the present invention. The discussion will then focus on a HDD and components connected therewith. The discussion will then focus on embodiments of an airflow diverter in a hard disk drive system.

Embodiments of the present invention are for an airflow diverter in a hard disk drive system. For example, in the operation of a HDD, airflows create pressure on components of the HDD. Such airflows may exert different pressures in different areas and on different components of the HDD. Actuator arms in the HDD are components of the HDD that experience pressure from the airflow. In the servo writing process of manufacturing an HDD such force and pressure exerted on the actuator arms may result in the read and write heads, located on the end of the actuator arms, becoming offset relative to each other. This is undesirable and can lead to track squeeze in a multiple heads HDD and otherwise cause inefficiencies in the operation of the HDD. This offset contributes to the overall level of track misregistration error (TMR).

In one embodiment, this problem may present itself when the top-most actuator arm experiences different forces due to the pressure difference from what the bottom-most actuator arm experiences. The differences in the airflow pattern can exist due to difference in clearance between the actuator arms and the housing of the HDD. For example, clearance between the bottom housing of the HDD and the bottom-most actuator arm may be less than the clearance between the top housing of the HDD and the top-most actuator arm. Embodiments of the present invention implement an airflow diverter in the HDD to so that the clearance between the top housing of the HDD and the top-most actuator arm approximate the clearance between the bottom housing of the HDD and the bottom-most actuator arm. Once this is accomplished, the pressure exerted on the top-most actuator arm will be approximately similar to that of the bottom-most actuator arm. This is turn will lead to a reduction in the relative offset between the read and write heads of the HDD. Embodiments of the present invention can easily be massed produced and are less expensive than prior art solutions.

The term "diverting" or "divert(s)" used in this document, as it refers to diverting airflow, could also be referred to as channeling airflow.

Operation

The basic HDD model includes a magnetic storage disk or hard disk that spins at a designed rotational speed. An actuator arm with a suspended slider is utilized to reach out over the disk. The slider has one or more magnetic read and write transducers or heads for reading and writing information to or from a location on the disk. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. Memory device 122 is capable of storing electronic data that can be used in the operation of HDD 110. Controller 150, and other components of HDD 110, has the ability to access memory device 122 to receive information, data, instruction or commands related to its operation.

Figure 2A:
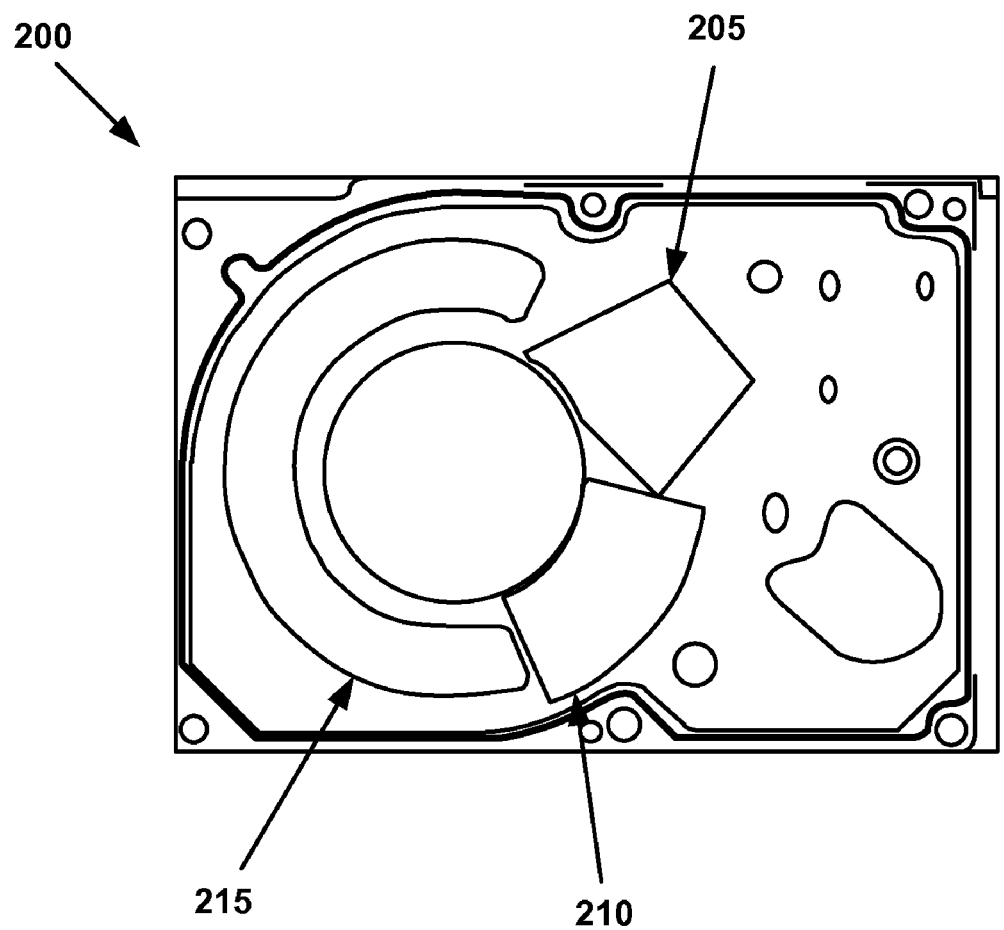
FIG. 2a is a block diagram of a top housing for a HDD in accordance with embodiments of the present invention.

With reference now to FIG. 2a, a block diagram of one embodiment of a top housing that may be used as a component of HDD 110. In one in embodiment, FIG. 2a includes; top housing 200, airflow diverter 205, filter and breather 210, and c-ring 215. In one embodiment, airflow diverter 205 has a top portion configured to couple with top housing 200. In one embodiment, airflow diverter 205 has thickness configured to create a top clearance between airflow diverter 205 and a top-most actuator arm where the top clearance approximates a bottom clearance between a bottom actuator arm and the bottom housing of HDD 110. In one embodiment, airflow diverter 205 has at least one surface configured to divert airflow in HDD 110 during the operation of HDD 110. It should be appreciated that airflow diverter 205 can be made of many different materials including, but not limited to, plastics, metals, rubbers, or any combination thereof. It should also be appreciated that airflow diverter 205 must be made of material that are able to hold its dimensional tolerance under the forces and pressures exerted upon it by airflows in HDD 110.

In one embodiment, top housing 200 is a housing that encloses the top portion of HDD 110. In one embodiment, top housing 200 is comprised of c-ring 215. In one embodiment, c-ring 215 is an indentation in top housing 200 and changes the clearance between top housing 200 and components in the interior of HDD 110. In one embodiment, c-ring 215 does not extend to the portion of top housing 200 that is coupled with airflow diverter 205.

In one embodiment, filter and breather 210 is capable of being coupled with top housing 200. In one embodiment, filter and breather 210 is configured to filter air entering an interior chamber of HDD 110 from an environment outside of HDD 110. In other words, air is able to enter HDD 110 by passing through filter and breather 210. It should be appreciated that, in one embodiment, filter and breather 210 is able to remove selected chemical and other impurities out of the air entering HDD 110 when the air passes through filter and breather 210. In one embodiment, filter and breather 210 is configured to allow air pressure in an interior chamber of HDD 110 to approximate air pressure outside of HDD 110. In one embodiment, the air pressure in HDD 110 is equalized with the air pressure in the environment immediately outside of HDD 110 by allowing air to breath or pass through filter and breather 210. In one embodiment, filter and breather 210 is capable of both filtering air entering HDD 110 and approximating air pressure in the interior of HDD 110 with the air pressure outside of HDD 110.

In one embodiment, HDD 110 is comprised of both filter and breather 210 and airflow diverter 205. In one embodiment, HDD 110 does not contain filter and breather 210 but does contain airflow diverter 205.

Figure 2B:
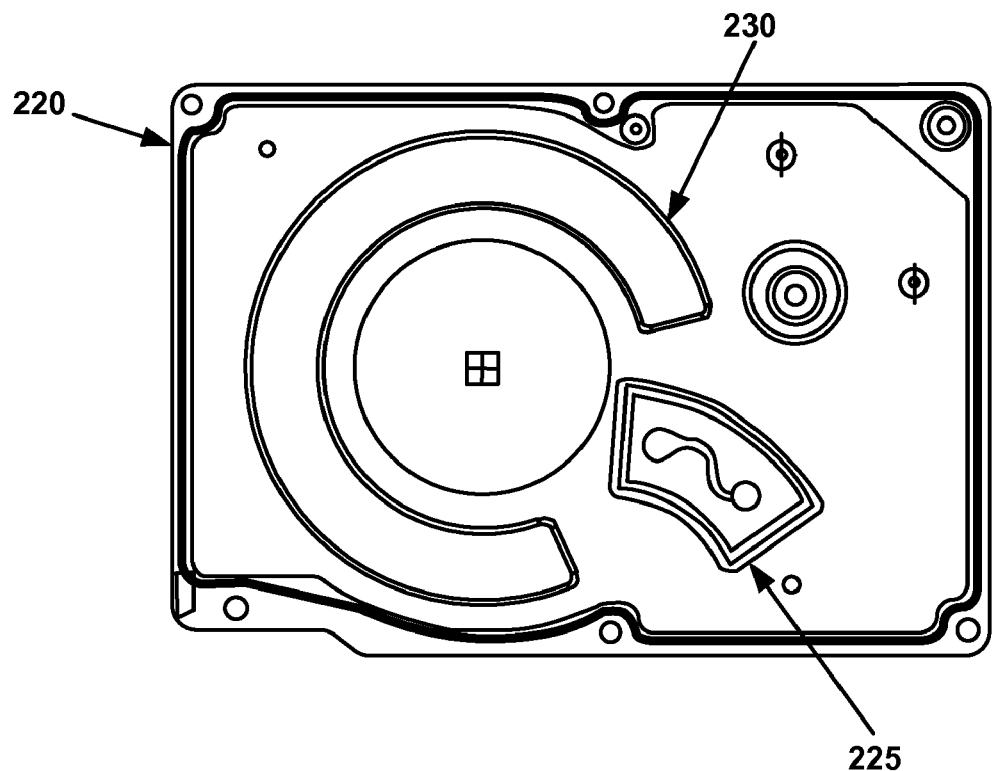
FIG. 2b is a block diagram of a top housing for a HDD in accordance with embodiments of the present invention.

With reference now to FIG. 2b, a block diagram of one embodiment of a top housing 220 that may be used as a component of HDD 110. In one in embodiment, FIG. 2b includes; top housing 220, airflow diverter 225, and c-ring 230. In one embodiment, airflow diverter 225 contains some or all of the features, abilities and components of airflow diverter 205. In one embodiment, airflow diverter 225 contains some or all of the features, abilities and components of airflow diverter 205 and some or all of the features, abilities and components of filter and breather 210. In one embodiment, airflow diverter 225 is coupled with top housing 220 in a position and location similar to which airflow diverter 205 would be coupled with top housing 200. In one embodiment, airflow diverter 225 is coupled with top housing 220 in a position and location similar to which filter and breather 210 would be coupled with top housing 200. It should be appreciated that airflow diverter 225 must be able to maintain a dimensional tolerance regardless of whether it is also acting as a filter or breather. By maintaining a dimensional tolerance, airflow diverter 225 is able to channel and divert airflows contained in HDD 110 in a consistent manner.

In one embodiment, c-ring 230 contains some or all of the features, abilities and components of c-ring 215. In one embodiment, HDD 110 does not contain filter and breather 210 but does comprise airflow diverter 225 in a position where filter and breather 210 would be located, in such an embodiment, c-ring 230 may be extended to the portion of top housing 220 where airflow diverter 205 would be positioned in top housing 200. For example, a comparison of c-ring 215 of FIG. 2a to c-ring 230 of FIG. 2b shows that c-ring 230 covers a greater portion of top housing 220 than c-ring 215 cover of top housing 200.

Figure 2C:
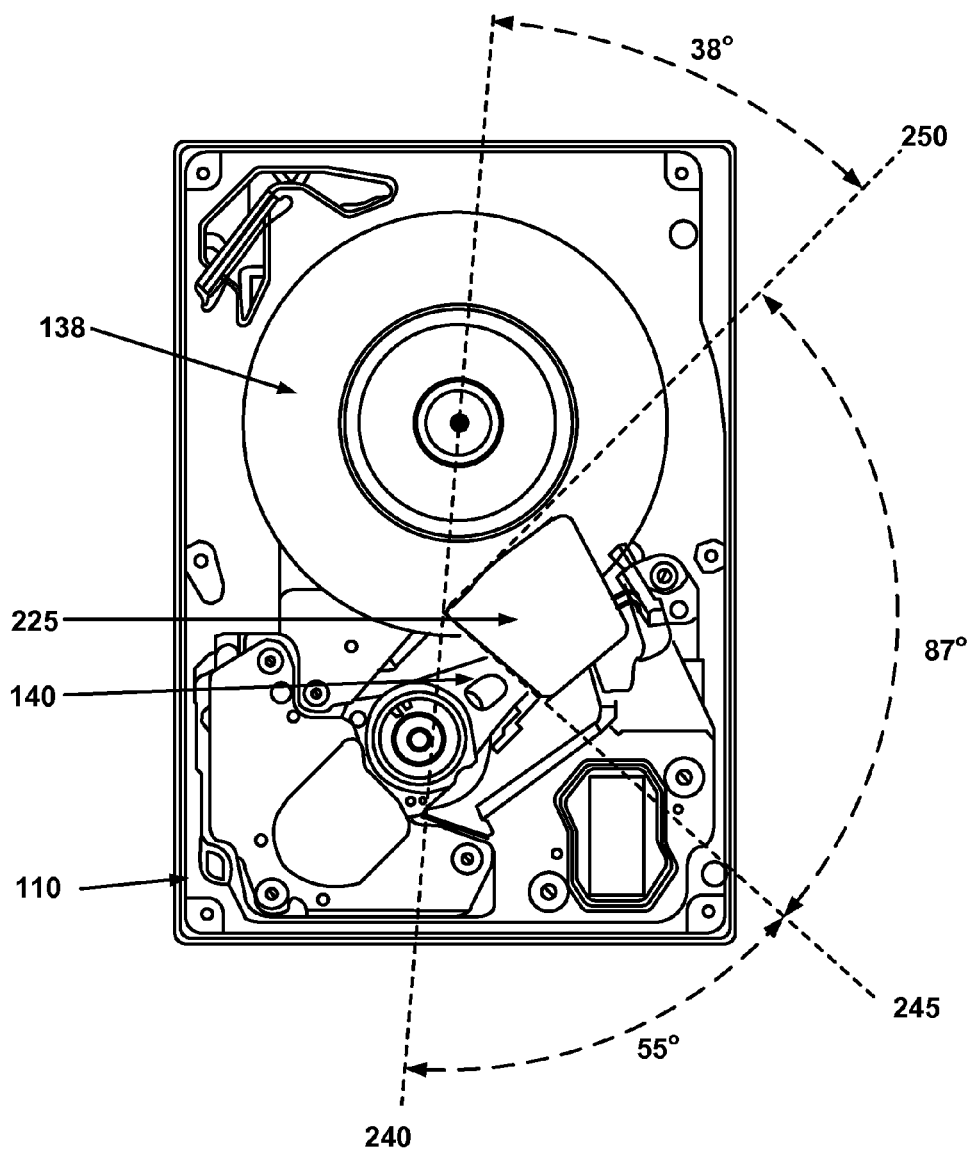
FIG. 2c is a block diagram of a HDD in accordance with embodiments of the present invention.

With reference now to FIG. 2c, a block diagram of one embodiment of HDD 110 used to illustrate one embodiment of dimensions for airflow diverter 225. In one in embodiment, FIG. 2c includes; HDD 110, disk 138, actuator assembly 140, airflow diverter 225 and reference lines 240, 245, and 250. In one embodiment, HDD 110, disk 138, and actuator assembly 140 are the same as the components in FIG. 1. In one embodiment, airflow diverter 225 is the same airflow diverter as airflow diverter 225 of FIG. 2b. In one embodiment, airflow diverter 225 is a polygon in shape with at least one angle less than ninety degrees. In one embodiment, airflow diverter 225 is roughly a trapezoid in shape.

FIG. 2c shows dotted reference lines which define angles and positions for an embodiment of airflow diverter 225. In one embodiment, reference line 240 goes through the center of disk 138 and the center of actuator assembly 140. The starting point for reference line 245 is located on reference line 240 at point that is between disk 138 and actuator assembly 140. The end point for reference line 245 is found by moving fifty five degrees counter clockwise, with a top down view of HDD 110, from actuator assembly 140. In one embodiment, a portion of reference line 245 defines a surface or edge of airflow diverter 225. The starting point for reference line 250 is located at the same starting point for reference line 245. The end point for reference line 250 is found by moving eighty-seven degrees counter clockwise, with a top down view of HDD 110, from reference line 245. In one embodiment, a portion of reference line 250 defines a surface or edge of airflow diverter 225. It should be appreciated that the reference lines of FIG. 2c are not meant to limit the present invention but only to demonstrate one possible embodiment.

Figure 3:
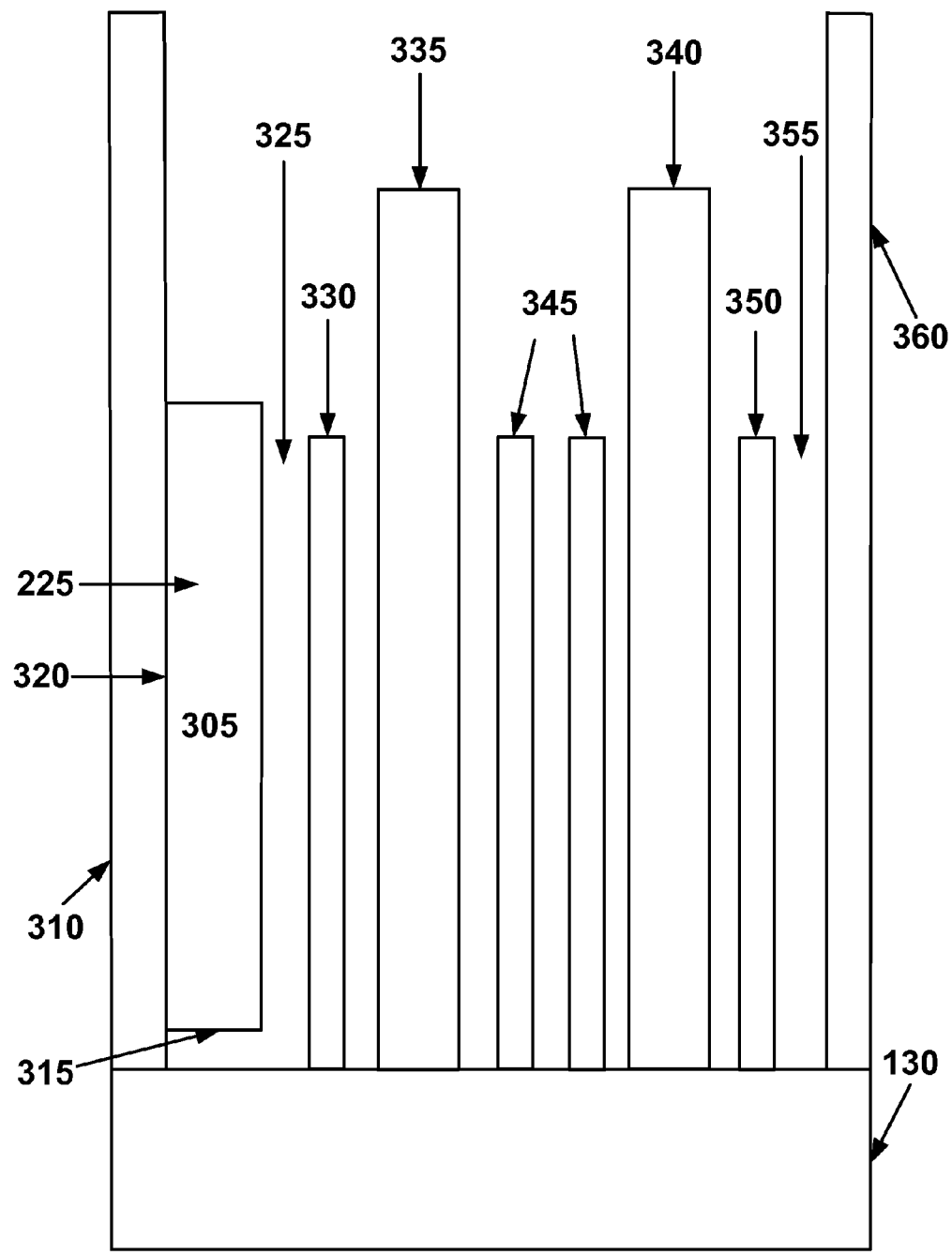
FIG. 3 is a block diagram of a HDD in accordance with embodiments of the present invention.

With reference now to FIG. 3, a block diagram used to illustrate a cross section of a portion of an embodiment of HDD 110 of FIG. 1. In one embodiment, HDD 110 includes airflow diverter 225, central drive hub 130, top housing 310, airflow diverter surface 315, airflow diverter top portion 320, airflow diverter thickness 305, top clearance 325, top actuator arm 330, top disk 335, bottom disk 340, middle actuator arms 345, bottom actuator arm 350, bottom clearance 355, and bottom housing 360. In one embodiment, airflow diverter top portion 320 is coupled with top housing 310. In one embodiment, airflow diverter top portion 320 is a flat planar surface. In one embodiment, airflow diverter top portion 320 is a single surface. In one embodiment, top housing 310 is the same as top housing 200. In one embodiment, top housing 310 is the same as top housing 220.

In one embodiment, bottom housing 360 is a housing or base plate that is coupled with HDD 110 to provide an enclosure and structure for the bottom portion of HDD 110.

In one embodiment, airflow diverter 225 of FIG. 3 is the same as airflow diverter 225 of FIG. 2b. In one embodiment, airflow diverter surface 315 is used to divert an airflow that is flowing through and near top clearance 325. In one embodiment, airflow diverter surface 315 accomplishes the diverting by the airflow impacting an angle of airflow diverter surface 315 incident to the airflow. In one embodiment, airflow diverter surface 315 accomplishes the diverting by the airflow away from an outer disk zone of top disk 335 to an inner disk zone of top disk 335. In one embodiment, airflow diverter surface 315 accomplishes the diverting by the airflow, traveling in a same direction as top disk 335, first impacting airflow diverter surface 315 then impacting top actuator arm 330. In one embodiment, airflow diverter 225 serves no other purpose than to than to allow top clearance 325 to approximate bottom clearance 355 and to divert an airflow in an airflow path of top clearance 325.

In one embodiment, top actuator arm 325, bottom actuator arm 350, and middle actuator arms 345 are actuator arms in HDD 110 and function the same as actuator arms 145 of FIG. 1. In one embodiment, top disk 335 and bottom disk 340 are magnetic disks and function the same as disk 138 in FIG. 1.

In one embodiment, airflow diverter thickness 305 is configured so that top clearance 325 approximates bottom clearance 355. For example, without airflow diverter 310, the difference between top clearance 325 and bottom clearance 255 may be quite different. Additionally, in one embodiment, when the difference between top clearance 325 and bottom clearance 255 is different, the airflows that flow through and near top clearance 325 and bottom clearance 255 are quite difference. Such a difference in airflows, in one embodiment, result in different pressures being exerted on top actuator arm 330 and bottom actuator arm 350. This difference in pressures, in one embodiment, leads to a relative offset of read and write heads. Thus by airflow diverter 310 serving to make top clearance 325 approximate bottom clearance 355, the pressures from airflows exerted on top actuator arm 330 approximate the pressures from airflows exerted on bottom actuator arm 350. Therefore, the relative offsets of read and write heads coupled with top actuator arm 325, bottom actuator arm 350, and middle actuator arms 345 is reduced.

In one embodiment, airflow diverter thickness 305 comprises a thickness that is less than two millimeters thick. It should be appreciated that top clearance 325 refers to the clearance, distance, space or air boundary between top actuator arm 325 and the closest portion of airflow diverter 310. It should be appreciated that bottom clearance 355 refers to the clearance, distance, space or air boundary between bottom actuator arm 350 and the closest portion of bottom housing 360.

FIG. 4 is a flowchart of method 400 for diverting an airflow during the operation of a disk drive system in accordance with one embodiment of the present invention.

At 402, a disk drive system is created, wherein the disk drive system comprises a bottom clearance between a bottom actuator arm of the disk drive system and a bottom housing of the disk drive system.

At 404, a top clearance is created by coupling an airflow diverter to a top housing of the disk drive, the top clearance housing is between the airflow diverter and a top actuator arm of the disk drive system, wherein creating the top clearance approximates the bottom clearance.

At 406, a bottom airflow path is detected in the bottom clearance.

At 408, a top airflow path is created in the top clearance using the airflow diverter, wherein creating the top airflow path approximates the bottom airflow path. It should be appreciated that creating a top airflow path is accomplished by selectively choosing the thickness of the airflow diverter and coupling the airflow diverter with the top housing in a selective location.

In one embodiment, method 400 further comprises, a top airflow which is diverted in the top airflow path using the airflow diverter such that the top airflow is approximately similar to a bottom airflow in the bottom airflow path.

In one embodiment, step 408 is accomplished by diverting the top airflow is accomplished by diverting the top airflow away from an outer disk zone of a disk in the disk drive system to an inner disk zone of the disk. In one embodiment, step 408 is accomplished by the top airflow, traveling in a same direction as a disk in the disk drive system, first impacts the airflow diverter then impacts the top actuator arm.

In one embodiment, method 400 also comprises filtering air from an environment outside of the disk drive system entering an interior chamber of the disk drive system, wherein the filtering takes place by the air passing through the airflow diverter.

In one embodiment, method 400 also comprises passing air through a breather port to allow the air pressure in an interior chamber of the disk drive system to approximate the air pressure outside of the disk drive system, wherein the pressure equalization takes place by the air passing through the airflow diverter.

Thus, embodiments of the present invention provide an airflow diverter in a hard disk drive system.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An airflow diverter for use in a disk drive system, said airflow diverter comprising;
   a top portion configured to couple with a top housing of said disk drive system;
   a thickness configured to create a top clearance between said diverter and a top actuator arm of said disk drive system wherein said top clearance approximates a bottom clearance between a bottom housing of said disk drive system and a bottom actuator arm of said disk drive system; and
   at least one surface configured to divert an airflow in said disk drive system during the operation of said disk drive system.

2. The airflow diverter of claim 1, wherein said airflow diverter is a filter configured to filter air from an environment outside of said disk drive system entering an interior chamber of said disk drive system.

3. The airflow diverter of claim 1, wherein said airflow diverter is a breather configured to allow air pressure inside of said disk drive system to approximate air pressure outside of said disk drive system.

4. The airflow diverter of claim 1, wherein said airflow diverter is the shape of a polygon with at least one angle less than ninety degrees.

5. The airflow diverter of claim 1, wherein said airflow diverter is configured to divert said airflow away from said top actuator arm of said disk drive system.

6. The airflow diverter of claim 1, wherein said airflow diverter is configured to divert said airflow away from an outer disk zone of a disk in said disk drive system to an inner disk zone of said disk.

7. The airflow diverter of claim 1, wherein said airflow diverter is configured to divert said airflow in said disk drive system such that a relative offset between a plurality of read and write heads of said disk drive system is reduced.

8. The airflow diverter of claim 1, wherein said airflow diverter is configured so that said airflow traveling in a same direction as a disk in said disk drive system first impacts said airflow diverter then impacts said top actuator arm.

9. A disk drive system comprising:
   a top housing;
   a bottom housing coupled to said top housing;
   a top actuator arm configured to operate over a surface of a top disk, wherein said surface of said top disk faces said top housing;
   a bottom actuator arm configured to operate over a surface of a bottom disk, wherein said surface of said bottom disk faces said bottom housing;
   a bottom clearance between said bottom housing and said bottom actuator arm;
   an airflow diverter configured to couple with said top housing and to divert airflow during operation of said disk drive system; and
   a top clearance between said airflow diverter and top actuator arm, wherein said top clearance approximates said bottom clearance.

10. The disk drive system of claim 9 further comprising:
    a filter configured to filter air from an environment outside of said disk drive system entering an interior chamber of said disk drive system; and
    a breather configured to allow air pressure in an interior chamber of said disk drive system to approximate air pressure outside of said disk drive system.

11. The disk drive system of claim 10, wherein said airflow diverter is also said filter and said breather.

12. The disk drive system of claim 9, wherein said airflow diverter is configured to be a shape such that there is an incident angle to said airflow for diverting said airflow.

13. The disk drive system of claim 9, wherein said airflow diverter is configured to divert said airflow away from an outer disk zone of a disk in said disk drive system to an inner disk zone of said disk.

14. The disk drive system of claim 9, wherein said airflow diverter is configured so that said airflow traveling in a same direction as a disk in said disk drive system first impacts said diverter then impacts said top actuator arm.

15. The disk drive system of claim 9, wherein said airflow diverter is configured to divert said airflow in said disk drive system such that a relative offset between a plurality of read and write heads of said disk drive system is reduced.

16. A method for diverting an airflow during the operation of a disk drive system, said method comprising:
    creating a disk drive system, wherein said disk drive system comprises a bottom clearance between a bottom actuator arm of said disk drive system and a bottom housing of said disk drive system;
    creating a top clearance by coupling an airflow diverter to a top housing of said disk drive, said top clearance housing is between said airflow diverter and a top actuator arm of said disk drive system, wherein said creating said top clearance approximates said bottom clearance;
    detecting a bottom airflow path in said bottom clearance; and
    creating a top airflow path in said top clearance using said airflow diverter, wherein said creating said top airflow path approximates said bottom airflow path.

17. The method of claim 16, wherein said method further comprises;
    filtering air from an environment outside of said disk drive system entering an interior chamber of said disk drive system, wherein said filtering takes place by said air passing through said airflow diverter.

18. The method of claim 16, wherein said method further comprises;
    passing air through a breather port to achieve pressure equalization by an air pressure in an interior chamber of said disk drive system approximating an air pressure outside of said disk drive system, wherein said passing air through said breather port takes place by said air passing through said airflow diverter.

19. The method of claim 16, wherein said diverting said top airflow is accomplished by diverting said top airflow away from an outer disk zone of a disk in said disk drive system to an inner disk zone of said disk.

20. The method of claim 16, wherein said diverting said top airflow is accomplished by said top airflow, traveling in a same direction as a disk in said disk drive system, first impacts said airflow diverter then impacts said top actuator arm.

* * * * *